(12) United States Patent
Kobayashi et al.

(10) Patent No.: US 7,305,821 B2
(45) Date of Patent: Dec. 11, 2007

(54) HYDRAULIC CONTROL APPARATUS

(75) Inventors: Masayuki Kobayashi, Kanagawa-ken (JP); Kazumichi Aoki, Kanagawa-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 59 days.

(21) Appl. No.: 11/315,188

(22) Filed: Dec. 23, 2005

(65) Prior Publication Data

US 2006/0142107 A1   Jun. 29, 2006

(30) Foreign Application Priority Data

Dec. 28, 2004 (JP) ............... 2004-381810
Dec. 6, 2005 (JP) ............... 2005-351979

(51) Int. Cl.
F15B 11/00 (2006.01)
F15B 11/05 (2006.01)
E02F 9/22 (2006.01)

(52) U.S. Cl. ............... 60/452; 60/422; 91/447

(58) Field of Classification Search ............ 60/422, 60/426, 452; 91/446, 447
See application file for complete search history.

(56) References Cited

U.S. PATENT DOCUMENTS 6,082,106 A   7/2000   Hamamoto 6,318,079 B1 * 11/2001 Barber .................. 60/422
6,978,607 B2 * 12/2005 Matsumoto et al. ..... 60/422

FOREIGN PATENT DOCUMENTS

| DE | 196 39 772 | 4/1998 |
|---|---|---|
| DE | 699 18 803 T2 | 8/2005 |
| DE | 10 2004 005 606 B3 | 10/2005 |
| EP | 0516864 A1 | 12/1992 |
| JP | 11311204 | 11/1999 |
| JP | 2002-029405 | 1/2002 |
| JP | 2002-295405 | 10/2002 |

* cited by examiner

*Primary Examiner*—Thomas E. Lazo
(74) *Attorney, Agent, or Firm*—DLA Piper US LLP (57) ABSTRACT

A hydraulic control apparatus is provided to prevent failure that can occur due to hunting, to elevate performance of a hydraulic control valve, and to improve operation efficiency by effectively conducting bleed off. The hydraulic control apparatus can include a first change over valve group that can include a change over valve connected with a first delivery line associated with the variable capacity pump, and arranged to have load sensing function. A second change over valve group can also be provided, and can include at least one change over valve connected with a second delivery line associated with the variable capacity pump. An open and close motion valve and a compensation valve can be configured to constitute a pressure compensation flow control means connected through the second delivery line and the second change over valve group.

7 Claims, 6 Drawing Sheets

PRIOR ART

FIG. 6

PRIOR ART

FIG. 7

HYDRAULIC CONTROL APPARATUS

BACKGROUND OF THE INVENTION

1. Field of the Invention

The present invention relates to a hydraulic control apparatus such as a construction machine, for example, a hydraulic shovel or the like, provided with a plurality of hydraulic actuators, and more specifically, relates to the hydraulic control apparatus which can selectively conduct a bleed off function in a way that in the case of operating a relatively heavy load, a plurality of actuators are simultaneously operated, and in the case of operating a relatively light load, only one actuator is operated at the same time, wherein in the case of the light load, a failure due to occurrence of hunting is prevented by conducting a bleed off function, and in the case of the heavy load, performance of a hydraulic control valve is elevated by suppressing the bleed off function, thereby improving the overall operation efficiency.

2. Description of Related Art

Figure 5:
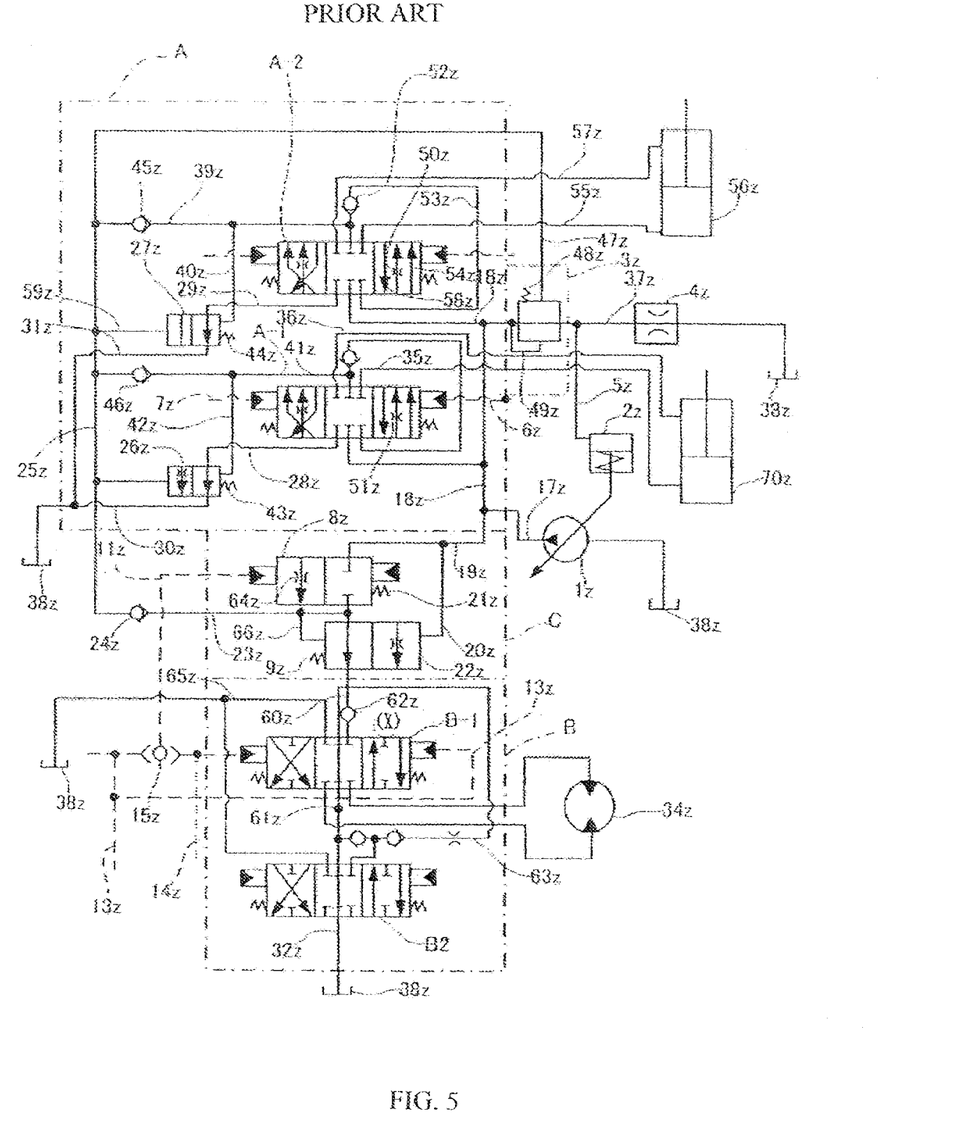
FIG. 5 illustrates a conventional hydraulic circuit diagram of a hydraulic control apparatus.

FIG. 5 illustrates a conventional hydraulic control circuit diagram on which the present invention is based directly. (Japanese laid open patent publication 2002-295405)

Figure 2:
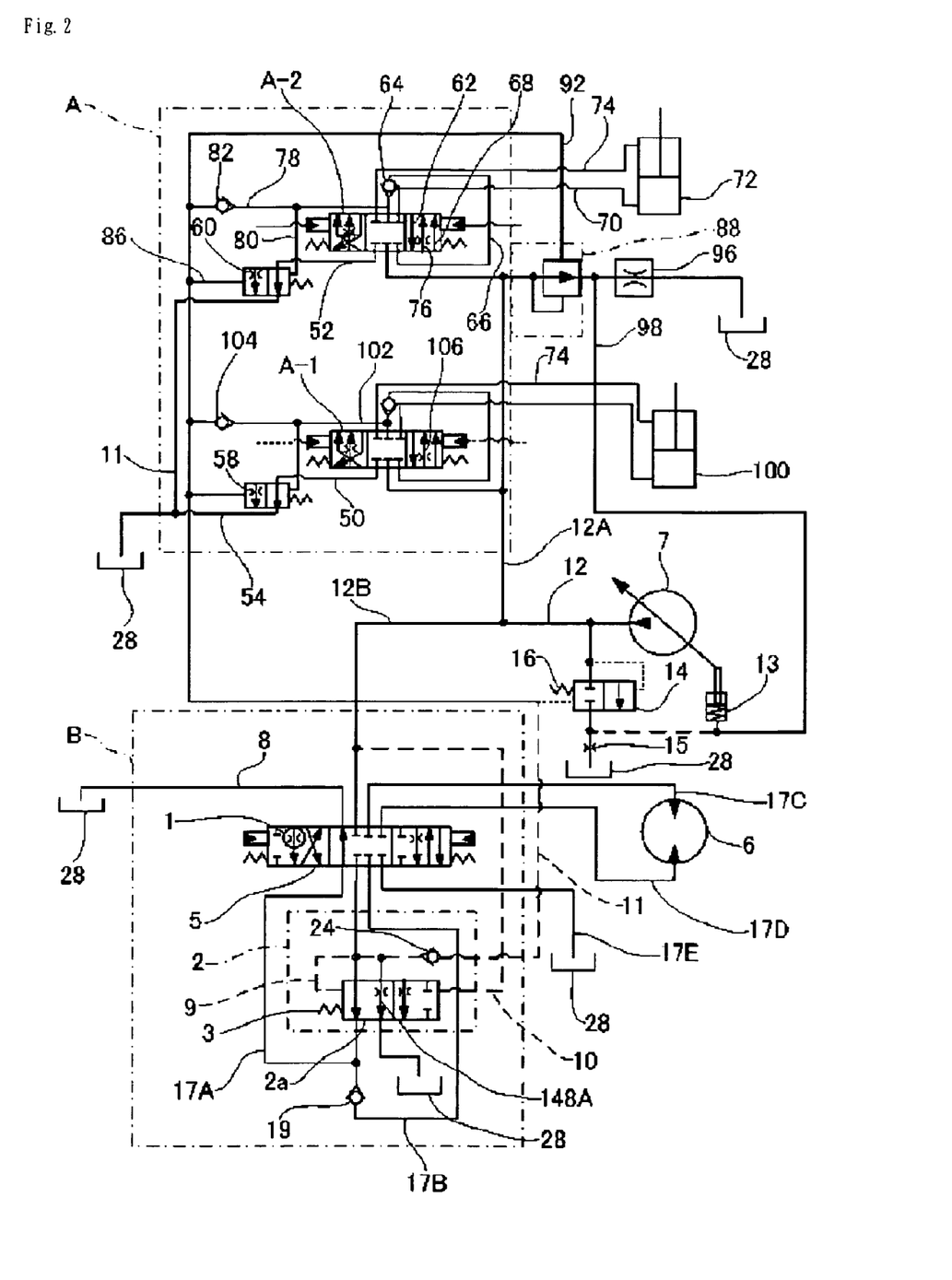
FIG. 2 illustrates a hydraulic circuit diagram of a hydraulic control apparatus in accordance with a second embodiment according to the present invention.
Figure 3:
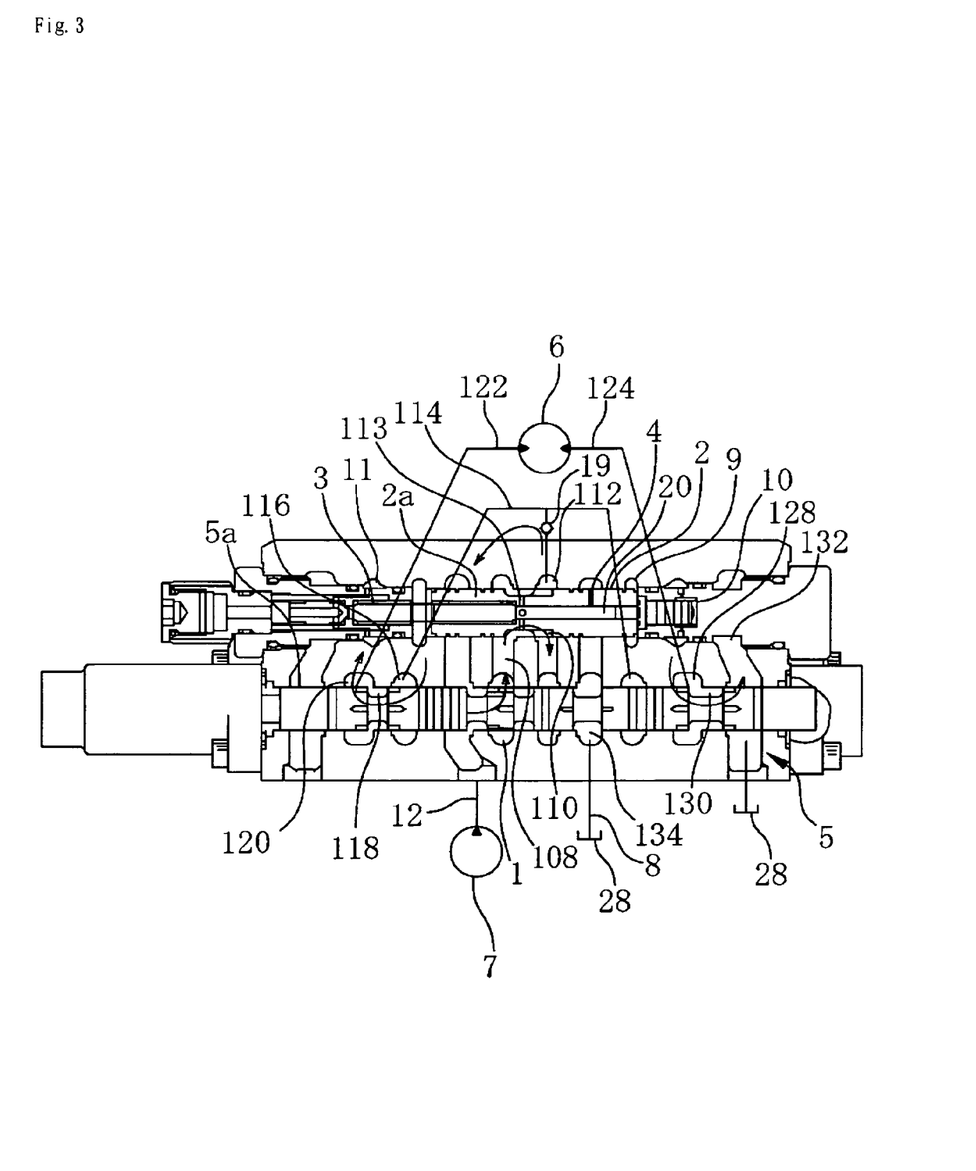
FIG. 3 illustrates a cross sectional view along the axis direction of the valve body of the hydraulic control apparatus in accordance with a third embodiment of the present invention relating to sole revolution operations.
Figure 6:
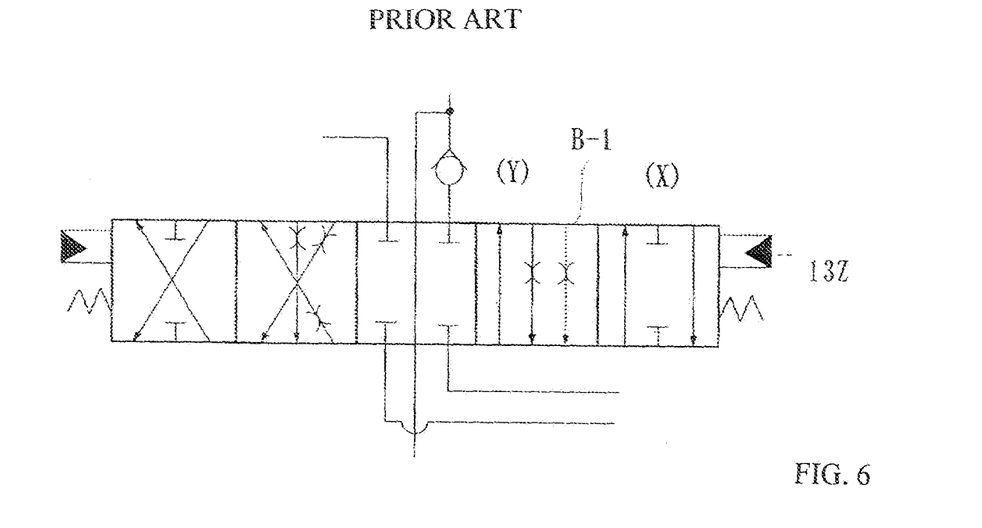
FIG. 6 illustrates an intermediate change over position of the change over valve B-1 in FIG. 5.
Figure 7:
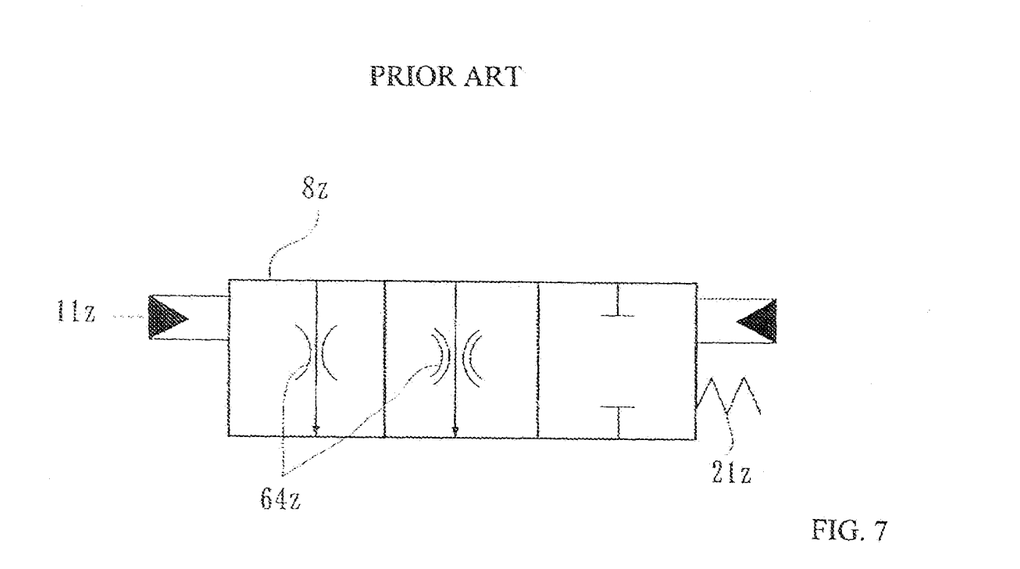
FIG. 7 illustrates an intermediate change over position of the compensation valve in FIG. 5.

In order to make it easy to understand the hydraulic control circuit diagram illustrated in FIGS. 2 and 3 with regards to the embodiments of the present invention, a detailed explanation of FIGS. 5, 6, and 7 follows.

In FIG. 5, a reference numeral 1Z is a variable-capacity pump. A delivery line 17 of the pump branches to supply lines 18Z and 19Z, and a first change over valve group (hereinafter: change-over valve group A) is connected to the variable-capacity pump 1Z through the supply line 18Z. A second change-over valve group (hereinafter: change-over valve group B) is connected to the variable-capacity pump 1Z through the supply line 19Z and a pressure compensation flow control means (hereinafter: block C). Change-over valves A-1 and A-2 in the change-over valve group A are connected through the supply line 18Z to the delivery line 17Z in parallel. Split flow compensation valves 26Z and 27Z are arranged respectively between the return lines 28Z and 29Z of each change-over valve A-1 and A-2, and tank lines 30Z and 31Z. The hydraulic oil from the tank lines 30Z and 31Z are discharged to a tank 38Z. Functions or roles of the change-over valves and the split flow compensation valves in the change-over valve group A are described below.

In FIG. 5, for example, when only the change-over valve A-2 is operated in the direction of left in the drawing, the pressurized hydraulic oil of a supply line 187 is supplied to an arm hydraulic cylinder 56Z provided in a hydraulic shovel through a check valve 527Z and passages 53Z, 54Z, and 55Z, through a throttle 50Z provided in the change-over valve A-2.

At the same time, the hydraulic oil from the arm hydraulic cylinder 56Z through passages 57Z, 58Z, and a return line 29Z reaches the split flow compensation valve 27Z, and then returns to the tank 38Z through the tank line 31Z.

In the present conditions, the pressurized hydraulic oil after passing the throttle 50Z can branch at the upstream of the check valve 52Z, and then, this branched passage can be further branched to a passage 397 and a passage 40Z. The passage 39Z is connected to a load sensing line 25Z through a check valve 45Z. The hydraulic oil pressure on the passage 40Z, together with a spring 44Z, acts in the direction of opening on the split flow compensation valve 27Z and the hydraulic oil pressure on the load sensing line 25Z acts in the direction of closing on the split flow compensation valve 27Z through a passage 59Z.

Since only the change-over valve A-2 is operated, the hydraulic oil pressure on the passage 40Z which acts in the direction of opening on the split flow compensation valve 27Z is equal to that on the passage 59Z which acts in the direction of closing. Also because the spring force of the spring 44Z is acting in the direction of opening on the split flow compensation valve 27Z, the split flow compensation valve 27Z is held in the state of full opening.

On the other hand, a bypass line 37Z is branched from the supply line 18Z, and a pressure regulating means 3Z and a pressure generating means 4Z are arranged on the bypass line 37Z.

On the pressure regulating means 3Z there is the force acting in the direction of closing, caused by the spring force of a spring 48Z, and by the hydraulic oil pressure on the load sensing line 25Z through the load sensing line 47Z, and also the hydraulic oil pressure on the supply line 18Z is acting in the direction of opening on the pressure regulating means 3Z through a passage 49Z.

Furthermore, a passage 5Z can branch from a portion at the downstream of the pressure regulating means 3Z on the bypass line 37Z and at the upstream of the pressure generating means 4Z. The hydraulic oil pressure on this passage 5Z acts on a delivery flow adjusting device 2Z for the variable-capacity pump 1Z, thereby controlling the amount of delivery flow of the variable-capacity pump 1Z in the fashion of the negative feedback control method. Accordingly, in such a configuration the degree of opening of the pressure regulating means 3Z is described below.

The hydraulic oil pressure at the upstream of the throttle 50Z in the change-over valve A-2 acts in the direction of opening on the pressure regulating means 3Z through the passage 49Z.

On the other hand, in the direction of closing of the pressure regulating means 3Z, the spring force of the spring 48Z and the hydraulic oil pressure at the downstream of the throttle 50Z in the change-over valve A-2 through the load sensing line 47Z act. That is, the pressure regulating means 3Z is adjusted to the degree of opening with which the force caused by the differential pressure before and behind the throttle 50Z in the change-over valve A-2 and the spring force of the spring 48Z balance, and then the hydraulic oil at the flow rate corresponding to the degree of opening flows to the pressure generating means 4Z.

Accordingly, at the upstream of the pressure generating means 4Z, the hydraulic oil pressure corresponding to the above-mentioned flow rate occurs. This hydraulic oil pressure acts on the delivery flow adjusting device 2Z through the passage 5Z, and the delivery quantity of the variable-capacity pump 1Z is adjusted. Since the differential pressure before and behind the throttle 50Z in the change-over valve A-2 becomes fixed regardless of the load pressure of the arm hydraulic cylinder 56Z, when the degree of opening of the throttle 50Z is held constant, the degree of opening of the pressure regulating means 37 becomes fixed.

Thus, the degree of the opening of the pressure regulating means 3Z will be dependent only on the degree of the opening of the throttle 507 of the change-over valve A-2.

The degree of opening of the throttle 50Z of the change-over valve A-2 changes with the control inputs to it. Therefore, pressure which acts on the delivery flow adjusting device 2Z causes the hydraulic oil quantity supplied to the arm hydraulic cylinder 56Z from the variable-capacity pump 1Z to be adjusted by the control input to the change-over valve A-2 regardless of the load pressure of the arm hydraulic cylinder 56Z.

Next, assuming that the change-over valve A-1 is operated in addition to the change-over valve A-2, and the load of a boom cylinder 70Z which is connected to the change-over valve A-1 is larger than that of the arm hydraulic cylinder 56Z, the load pressure of the boom cylinder 70Z connected to the change-over valve A-1 acts on the load sensing line 25Z through a path 41Z and a check valve 46Z.

Since the load of the boom cylinder 70Z connecting with the changeover valve is larger than that of the arm hydraulic cylinder 56Z, the pressure acts in the direction of closing on the split flow compensation valve 27Z in the side of light load (i.e., the arm hydraulic cylinder 56Z) through a passage 59Z, and the observed pressure of the arm hydraulic cylinder 56Z rises. As a result, in both change-over valves, the differential pressure at the throttles 50 and 51 becomes equal, and then those hydraulic actuators connected to the change-over valves A-2 and A-1 can be operated simultaneously even when those loads differ.

Next, block C defined herein as a pressure compensation flow control means and the change-over valve group B defined herein as the second change-over valve group, both of which are connected at the downstream of the block C will be explained.

The supply line 19Z which is branched from the delivery line 17Z of the variable capacity pump 1Z is arranged in the block C, and an open and close motion valve 8Z is arranged at the downstream of the line 19Z.

A compensation valve 22Z is arranged at the downstream of the open and close motion valve 8Z. Further, the hydraulic oil pressure at the downstream of the above-mentioned valve 8Z and the upstream of the compensation valve 22Z is supplied through a passage 23Z and a check valve 24Z to the load sensing line 25Z of the change-over valve group A. The hydraulic oil pressure at the upstream of the open and close motion valve 8Z acts on the valve 22Z in the direction of closing through a passage 20Z.

On the other hand, the hydraulic oil pressure at the downstream of the valve 8Z is acting on the valve 22Z in the direction of closing together with the spring force of a spring 9Z through the passage 23Z and a passage 66Z.

In addition, the open and close motion valve 8Z intercepts the passage from the supply line 19Z to the compensation valve 22Z, when it is in the neutral position by the spring force of a spring 21Z.

The change-over valve group B is arranged in the downstream of the block C, and the hydraulic oil passing through the compensation valve 22Z is supplied to a supply line 60Z of the change-over valve group B.

In FIG. 5, change-over valves B-1 and B-2 which constitute the change-over valve group B, are of the ordinary type of the open-center, and the hydraulic oil supplied to the supply line 60Z is discharged to the tank 38Z through center-bypass passages 61Z and 32Z, when each of the change-over valves B-1 and B-2 are in the neutral position.

Furthermore, the change-over valve B-1 is connected to the pilot valve which is not illustrated, through signal lines 13Z and 14Z, and signal lines 13Z and 14Z are connected to the opening side of the open and close motion valve 8Z through a shuttle valve 15Z and through the signal line 11Z.

Next, with regards to the block C and the change-over valve group B, operation will be explained based on FIGS. 5, 6 and 7, based on when only the changeover valves in the change-over valve group B are actuated.

When the pilot valve (not illustrated) is operated, and then a hydraulic oil pressure signal is applied through a hydraulic oil pressure signal line 13Z to the change-over valve B-1, the change-over valve B-1 moves to the left in FIG. 5.

At the same time, the hydraulic oil pressure signal of the signal line 13Z acts on the open and close motion valve 8Z through a shuttle valve 15Z and the signal line 11Z, and the passage in the valve 8Z changes from a full closing position to a throttling position. That is, the open and close motion valve 8Z is interlocked with the control input of the change-over valve B-1, and the degree of opening is adjusted.

In addition, as shown in FIG. 7, the degree of opening of a throttle 64Z in the open and close motion valve 8Z is usually set up so that the opening of the throttle 64Z may increase gradually in accordance with the rise of the hydraulic oil pressure on the signal line 11Z. When the hydraulic oil pressure signal is applied to the signal line 13Z so that the change-over valve B-1 and the open and close motion valve 8Z are operated, and then the change-over valve B-1 moves, the supply line 60Z is connected to a revolution motor 34Z through a check valve 62Z, and the return hydraulic oil from this revolution motor 347 will be discharged through a return line 65Z to the tank 38Z via the passage which corresponds in the location of (X) indicated in FIG. 6. The hydraulic oil quantity supplied to the supply line 60Z through the block C from the supply line 19Z is determined by the degree of opening of the throttle 64Z in the valve 8Z, and the degree of opening of the compensation valve 22*z*. The degree of opening of the compensation valve 22Z is described below.

The hydraulic oil pressure at the upstream of the throttle 64Z in the valve 8Z acts on the compensation valve 22Z in the direction of closing. On the other hand, the hydraulic oil pressure at the downstream of the throttle 64Z in the valve 8Z, and the spring force of the spring 9Z act on the compensation valve 22Z in the direction of opening. That is the compensation valve 227 tends to be closed by the differential pressure (i.e., differential pressure before and behind the throttle 64) at the upstream of the throttle 64 of the valve 8Z, and at the downstream thereof, and tends to be opened by the spring force of the spring 9Z.

Accordingly, regulating the operation of the degree of opening of the compensation valve 22Z is automatically carried out based on the degree of opening corresponding to the differential pressure applied before and behind the throttle 64Z and the spring force of the spring 9Z balance.

Therefore, regardless of the working hydraulic pressure to the actuator, the degree of opening of the compensation valve 22Z is dependent only on the degree of opening of the open and close motion valve 8Z i.e., the control input to the change-over valve B-1.

On the other hand, the hydraulic oil pressure at the downstream of the open and close motion valve 8Z is led to the opening side of the pressure regulating means 3Z through a passage 23Z, a check valve 24Z, and the load sensing lines 25Z and 47Z, and the pressure at the upstream of the throttle 64Z in the open and close motion valve 8Z is led to the opening side of the pressure regulating means 3Z through supply lines 18Z, 19Z and a passage 49Z.

Accordingly, the amount of delivery flow from the variable-capacity pump 1Z is adjusted so that the pressure drop (i.e., differential pressure before and behind the throttle 64Z) which depends on the throttle 64Z in the open and close motion valve 8Z may balance with the spring force of the spring 48Z. When the hydraulic oil pressure of the signal line 13Z rises, the hydraulic oil quantity supplied to the change-over valve group B from the block C increases, because the degree of opening of the throttle 64Z in the open and close motion valve 8Z will increase.

Further, because the change-over valve B-1 is of the type of the open-center, the operability can be smooth since the degree of opening of the passage to the revolution motor 34 gradually increases, while the center-bypass passage is gradually closed in accordance with the control input as shown in FIG. 6. In other words, the amount of supply of the hydraulic pressure oil supplied to the revolution motor 34Z increases in accordance with the incremental increase in the control input to the change-over valve B-1.

Accordingly, the revolution motor 34Z can drive a hydraulic actuator having very large inertia, such as a revolution motor provided in the hydraulic shovel, without an occurrence of a jumping out feeling at the starting time, because hydraulic oil pressure compensation is always carried out by the aid of a load sensing function. Thus, a smooth starting performance can be achieved.

As mentioned above, while applying the load sensing function to the actuators connected to the change-over valve group A in accordance with the present invention, the function of the open-center can be applied, without using another pump for the actuators connected to the changeover valve group B. That is, the actuator suitable for connection with a change-over valve provided with the load sensing function and the actuator suitable for connection with a change-over valve provided with the function of the open-center can be both driven by a common variable-capacity pump.

Accordingly, even when two or more actuators provided in the hydraulic shovel, are operated simultaneously, each of the actuators can differ in inertia and load pressure. The optimal operation for the property of each actuator can be performed, and in addition, the problem of the increased cost caused by arranging another pump for revolution operations and the problem that the layout of control equipment pose difficulties that need solutions.

However, further improvement with regards to the hydraulic control circuit illustrated in FIG. 5 may be achieved, because its performance is largely affected by the load when driving an actuator with a relatively heavy load of inertia, such as the revolution in the construction machinery as a hydraulic shovel, which makes use of the above mentioned hydraulic control circuit. A hunting phenomenon can occur in the hydraulic circuit and the performance of the actuator can become clumsy, particularly wider the condition of a small revolution orientation, i.e., the boom is oriented nearly to the vertical direction. As a result, the moment of inertia can be small, and the control input is fed back through the operator who manipulates the handling lever of the hydraulic shovel.

To eliminate the hunting phenomenon, a bleed off approach is generally proposed that prevents the hydraulic oil pressure from rising sharply by having a control valve arranged between an actuator and a tank. For example, a directional change over valve is opened while the actuator is operated, thereby partially discharging the pressurized hydraulic oil in the hydraulic circuit to the tank.

The bleed off, which refers to discharging pressurized hydraulic oil to a tank, is effective in eliminating a hunting phenomenon that is caused by a heavy load and a sharp rise of the hydraulic oil pressure. However, discharging the pressurized hydraulic oil to the tank lowers the hydraulic pressure and flow rate in the hydraulic circuit, and as the result, induces lowering of operation efficiency.

On the other hand, when there is relatively low demand for the flow rate in the hydraulic circuit, such as the sole operation for revolution, no remarkable difference in the hydraulic pressure or the flow rate is noticed between bleeding off and the absence of bleeding off.

But, when demand for the flow rate of pressurized oil increases due to a complex operation of combining the heavy load caused by lifting heavy goods with the revolution operation, the difference in the flow rate or in the hydraulic pressure becomes remarkable. In such a condition it follows that the operation efficiency itself becomes worse when bleeding off as mentioned above.

Furthermore, a hydraulic oil passage may be formed between a spool of a valve body and inside of the valve body so as to enable to bleed off within the change over valve, which controls the pressurized oil supply and discharge to and from a designated hydraulic actuator. As the result, this passage formed for bleeding off conducts the bleed off, even when demand for the flow rate of pressurized oil increases because of the complex operation of combining the heavy load with the revolution operation, causing the operation efficiency to become worse.

Thus, an object of the present invention is to provide a hydraulic control apparatus capable of preventing failure due to occurrence of hunting; to improve the performance of a hydraulic control valve; and to improve operation efficiency by effectively conducting the bleed off.

Here, the above "effectively conducting the bleed off" means that the bleed off is selectively conducted in accordance with a state of operation in the hydraulic circuit, such that when there is a relatively small demand for the flow rate in the hydraulic circuit, such as the sole operation of revolution, the bleed off is conducted so as to suppress the hunting. When the demand for the flow rate increases in the hydraulic circuit because of the complex operation of combining the heavy load with the revolution operation, the bleed off is ceased.

SUMMARY OF THE INVENTION

To accomplish the object, the hydraulic control apparatus according to the present invention, is provided with a variable capacity pump, a first change over valve group including at least one change over valve connected with a first delivery line branched from a delivery line of the variable capacity pump and arranged to have load sensing function, a delivery flow control means for adjusting delivery flow rate of the variable capacity pump by receiving a hydraulic oil pressure signal from a load sensing line arranged in accordance with the change over valve having the load sensing function, a second change over valve group including at least one change over valve connected with a second delivery line branched from the delivery line of the variable capacity pump, an open and close motion valve connected with the second delivery line at a upstream side of the second change over valve group and having functions of open and close, and throttle in accordance with a hydraulic operation pressure signal to the change over valve belonging to the second change over valve group, and a compensation valve arranged at a downstream side of the open and close motion valve, an outlet side of the compensation valve being connected with the second change over valve group, wherein one side of the compensation valve is forced through forces caused by hydraulic oil pressure at an outlet port of the open and close motion valve and a spring with a given spring force, and the opposite side of the compensation valve is forced through force caused by hydraulic oil pressure on the second delivery line, wherein the compensation valve is acted in the direction of opening by hydraulic oil quantity supplied from the outlet of the open and close motion valve due to the force of the one side, and is acted in the direction of closing by hydraulic oil quantity supplied from the outlet of the open and close motion valve due to the force of the opposite side, and wherein the compensation valve is provided with a bleed off passage which is connected with the outlet side of the open and close motion valve, and hydraulically communicates with a tank side when the force of said one side is superior to the force of said opposite side.

In an embodiment of the present invention, the compensation valve can be provided with a check valve arranged between the outlet side of said open and close motion valve, and said load sensing line.

In another embodiment of the present invention, at least one change over valve of the second change over valve group can be configured to be connected with a hydraulic motor for revolution operation of a hydraulic shovel.

Further, in another embodiment of the present invention, at least one change over valve of the second chance over valve group can be constituted to be a change over valve in which the open and close motion valve is incorporated.

Still further in another embodiment of the present invention, a valve body of at least one change over valve of the second change over valve group and a valve body of the compensation valve can be constituted to be one body so that each hydraulic port of the change over valve and the compensation valve becomes common in the one body.

Also, in another embodiment of the present invention, at least one change over valve of the second change over valve group can be constituted to be of the type of open center.

Further, in an embodiment of the present invention, one change over valve of the first change over valve group can be constituted to be a change over valve for operating a boom provided in the hydraulic shovel, and one change over valve of the second change over valve group can be constituted to be a change over valve for operating a hydraulic motor for revolution operation provided in the hydraulic shovel.

According to the present invention, the hydraulic control apparatus is configured to be provided with a variable capacity pump, a first change over valve group including at least one change over valve connected with a first delivery line branched from a delivery line of the variable capacity pump and arranged to have load sensing function, a delivery flow control means for adjusting delivery flow rate of the variable capacity pump by receiving a hydraulic oil pressure signal from a load sensing line arranged in accordance with the change over valve having the load sensing function, a second change over valve group including at least one change over valve connected with a second delivery line branched from the delivery line of the variable capacity pump, an open and close motion valve connected with the second delivery line at a upstream side of the second change over valve group and having functions of open and close, and throttle in accordance with a hydraulic operation pressure signal to the change over valve belonging to the second change over valve group, and a compensation valve arranged at a downstream side of the open and close motion valve, an outlet side of the compensation valve being connected with the second change over valve group, wherein one side of the compensation valve is forced through force caused by hydraulic oil pressure at an outlet port of the open and close motion valve and a spring with a given spring force, and the opposite side of the compensation valve is forced through force caused by hydraulic oil pressure on the second delivery line, wherein the compensation valve is acted in the direction of opening by hydraulic oil quantity supplied from the outlet of the open and close motion valve due to the force of the one side, and is acted in the direction of closing by hydraulic oil quantity supplied from the outlet of the open and close motion valve due to the force of the opposite side, and wherein said compensation valve is provided with a bleed off passage which is connected with the outlet side of the open and close motion valve, and hydraulically communicates with a tank side when the force of said one side is superior to the force of said opposite side.

Thus, it is advantageous that the hydraulic control apparatus can be capable of selectively conducting a bleed off function when operating a relatively heavy load in which a plurality of actuators are simultaneously operated. When operating a relatively light load in which only one actuator is operated at the same time, failure due to the occurrence of hunting is prevented by conducting the bleed off function. When operating a relatively heavy load, performance of a hydraulic control valve is improved by suppressing the bleed off function, thereby improving the overall operation efficiency.

BRIEF DESCRIPTION OF THE DRAWINGS

The above and other objects, features, and advantages of the present invention will be made more apparent from the description of preferred embodiments with reference to the accompanying drawings wherein.

DETAILED DESCRIPTION OF THE PREFERRED EMBODIMENTS

The detailed description of the present invention will be explained referring to FIGS. 1 to 4.

Embodiment 1

Figure 1:
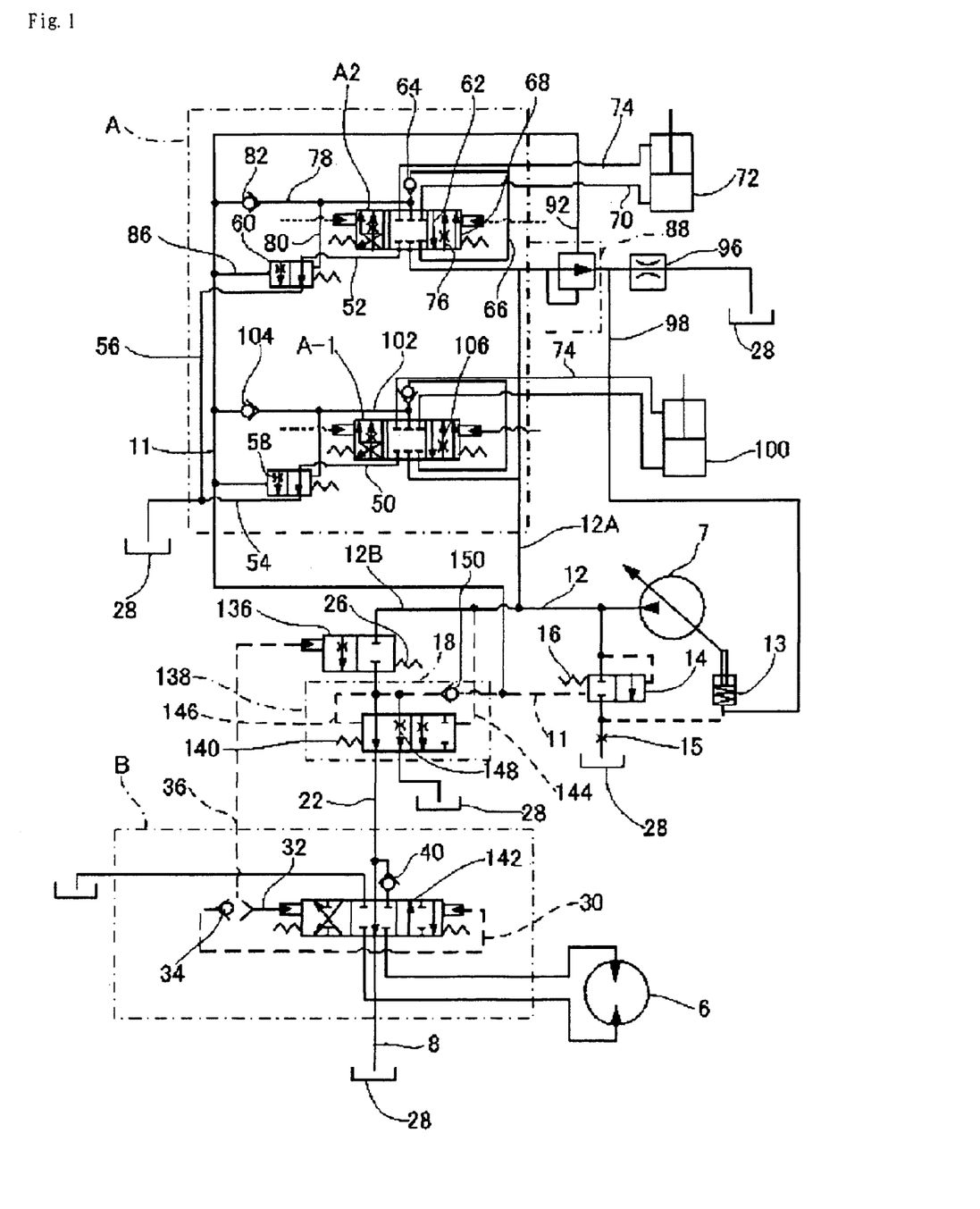
FIG. 1 illustrates a hydraulic circuit diagram of a hydraulic control apparatus in accordance with a first embodiment according to the present invention.

In FIG. 1, reference numeral 7 designates a variable capacity pump. A delivery line 12 of the pump 7 branches delivery lines 12A and 12B. A first change over valve group A (hereinafter: change over valve group A) is connected through the delivery line 12A to the variable capacity pump 7. A second change over valve group B (hereinafter: change over valve group B) is connected through the delivery line 12B and a pressure compensation flow control means including an open and close motion valve 136 and a compensation valve 138 to the variable capacity pump 7. A change over valve A-1 and a change over valve A-2 in the change over valve group A are connected in parallel with the delivery line 12 through the delivery line 12A, respectively.

There are provided with split flow compensation valves 58 and 60 located between the return line 50 and 52 of the change over valves A-1 and A-2, and tank lines 54 and 56. The discharge hydraulic oil from the tank lines is discharged to a tank 28.

The detailed explanation about the first change over valve group A and its neighboring circuit will be skipped because those have been explained above in the discussions relating to FIG. 5.

In addition, reference numeral 13 designates a cylinder for driving a swash plate that controls delivery flow rate of the variable capacity pump 7, and a reference numeral 14 designates a control valve which produces hydraulic oil pressure to the cylinder 13 in accordance with the delivery line 12 and a load sensing line 11. Reference numeral 15 designates a hydraulic pressure generating means, and reference numeral 16 designates a spring for forcing the control valve 14, which functions so that the hydraulic oil pressure on the delivery line 12 is always added by a given pressure a than the pressure on the load sensing line 11. The cylinder 13, control valve 14, pressure generating means 15 and spring 16 constitute a delivery flow rate control means of the present invention.

As previously described, the open and close motion valve 136 is provided at the downstream of the delivery line 12B, which is branched from the delivery line 12 of the variable capacity pump 7. Also, the compensation valve 138 is provided at the downstream of the open and close motion valve 136. On the right side of the open and close motion valve 136 there is provided a spring 26 which functions to close the open and close motion valve 136 when no hydraulic oil pressure signal to a change over valve B is applied through a pressure signal line 36.

In addition, the pressure at the downstream of the open and close motion valve 136 and at the upstream of the compensation valve 138 is connected with the load sensing line 11 of the change over valve group A through a passage 18 and a check valve 150. Here, the hydraulic pressure on the load sensing line 11 is lower than that of the outlet side of the open and close motion valve 136. For example, when only a hydraulic motor 6 for revolution operation is driven under no operation of the change over valve group A, the hydraulic load pressure is transmitted through a line 22 to the outlet side of the open and close motion valve 136, and then through the check valve 150. The hydraulic load pressure then becomes a new hydraulic pressure on the load sensing line 11 and is supplied to the control valve 14.

On the other hand, when the hydraulic pressure on the load sensing line 11 is higher than that of the outlet side of the open and close motion valve 136, the hydraulic load pressure does not reflect on the load sensing line 11 because the check valve 150 blocks the load pressure of the hydraulic motor 6. The compensation valve 138 is forced in the direction of closing by the hydraulic pressure at the upstream of the open and close motion valve 136 through a passage 144, i.e., the pressure on the delivery line 12B, and on the other hand, in the direction of opening by the hydraulic pressure at the downstream of the open and close motion valve 136 through a passage 146 and the passage 18, together with spring force of a spring 140.

In FIG. 1 only one change over valve B constituting the change over valve group B is illustrated. This change over valve B is of the type of usual open center. The pressurized hydraulic oil supplied to the delivery line 22 is discharged to the tank 28 through a center bypass passage 22 and a tank line 8 when the change over valve B is in the neutral position.

In addition, the change over valve B is connected through hydraulic pressure signal lines 30, 32 to a pilot valve (not shown), respectively. Thus, the hydraulic pressure signal lines 30, 32 are connected via a shuttle valve 34, and through pressure signal line 36 to the opening side (left side).

In addition, it is preferable from the object of the present invention that the spring force of the spring 140 is set to be equal to or more than that of the spring 16. Reference numeral 148 designates an inside passage for bleeding off formed in the compensation valve 138. The upstream side of the passage 148 for bleeding off is connected to a splitting from the outlet side of the open and close motion valve 136, as shown in FIG. 1, and the downstream side of the passage 148 is connected to the tank 28 through the tank line. In such a configuration of the compensation valve 138, when the hydraulic motor 6 is driven by the operation hydraulic pressure signal that is applied to the change over valve B, and a boom cylinder 100 is driven by the operation hydraulic pressure signal that is simultaneously applied to the change over valve A-1 for the boom cylinder, i.e., one of the change over valve group A, the hydraulic oil pressure of the load sensing line 111 becomes high. As a result, the differential pressure of the line (passage) 144 and the line (passage) 146 increases resulting in better performance than the spring force associated with the spring 140, whereby the passage 148 for bleeding off is closed and then the bleed off does not function.

On the contrary, when the change over valve group A is not operated and only the hydraulic motor 6 for revolution operation is driven, the spring force of the spring 140 results in better performance than the differential pressure of the lines 144 and 146, and becomes larger than the differential pressure, causing the passage 148 for bleeding off to open and then the bleed off to function.

Embodiment 2

FIG. 2 illustrates the functions of the open and close motion valve 136 shown in FIG. 1 being incorporated inside the directional change over valve 5 for the hydraulic motor 6 for revolution operation. In addition, as to the constituent elements corresponding to those in the hydraulic circuit shown in FIG. 1, the same reference number is used in FIG. 2. Accordingly, new constituent portions will be mainly explained below.

In FIG. 2 reference numeral 2 designates a compensation valve corresponding to the compensation valve 138 shown in FIG. 1. A spool 2a (see FIG. 3 and FIG. 4) of the compensation valve 2 is forced in the direction of opening by a spring 3. A hydraulic pressure room 10 of the compensation valve 2 is connected with the upstream of a variable throttle 1 in the directional change over valve 5. That is, the delivery line 12B, and a hydraulic pressure room 9 of the compensation valve 2 is connected with the downstream of the variable throttle 1 and the upstream of the compensation valve 2. Accordingly, in the spool 2a of the compensation valve 2, the differential pressure of the upstream and the downstream in the variable throttle 1 opposes to the spring force of the spring 3. Further, an inside passage 20 (see FIG. 3 and FIG. 4) of the spool 2a of the compensation valve 2 is connected with the load sensing line 11 through which the passage 20 is led as a control hydraulic pressure of the variable capacity pump 7.

Figure 4:
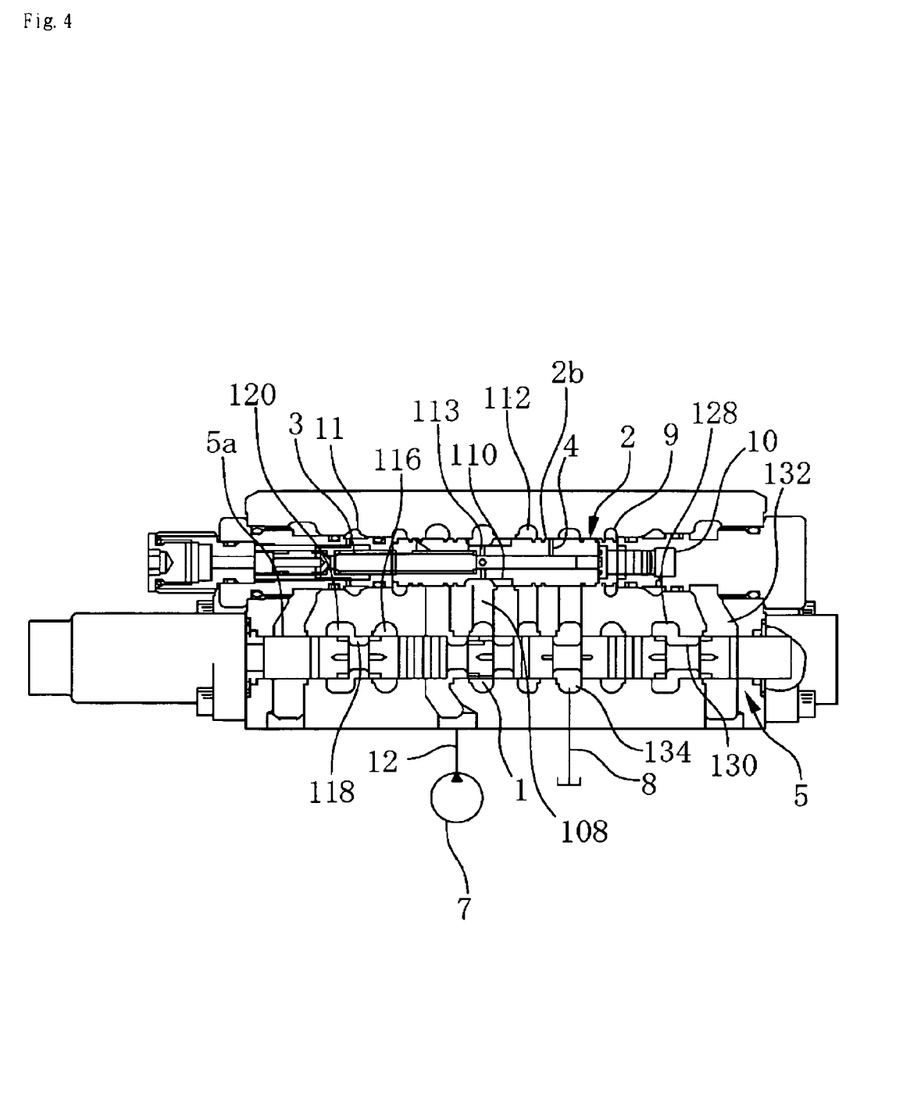
FIG. 4 illustrates a cross sectional view along the axis direction of the hydraulic control apparatus in accordance with a fourth embodiment of the present invention relating to complexity operations that combines revolution operations with operations of other actuators.

Further, there is provided a tank passage 4 in the spool 2a of the compensation valve 2, and the tank passage 4 is configured to close when the spool 2a of the compensation valve 2 moves. Also, the hydraulic pressure at the downstream of the directional change over valve 5 and the upstream side of the compensation valve 2 is connected through a passage 9 and a check valve 24 with the load sensing line 11 of the change over valve group A. In addition, reference numeral 148A designates a passage for bleeding off.

As illustrated in FIG. 2, the hydraulic circuit configuration of the compensation valve 2 is substantially similar to the compensation valve 138 in FIG. 1, and also, the hydraulic circuit configuration of connection between the compensation valve 2 and, the load sensing line 11 and the delivery line 12B is substantially similar to those in FIG. 1. Accordingly, the bleed off function in the passage 148A is similar to the hydraulic circuit operation in FIG. 1 mentioned above. In addition, though FIG. 2 illustrates the directional change over valve 5 being located at the upstream side of the compensation valve 2 in appearance, the flow of pressurized hydraulic oil is also equal to that in FIG. 1. Namely, assuming that the directional change over valve 5 has been changed from the neutral position shown in FIG. 1 to the left position so as to drive the hydraulic motor 6 for the revolution operation, the pressurized hydraulic oil supplied from the delivery line 12B passes through the variable throttle 1, and further passes the compensation valve 2 in the state shown in FIG. 2. Because a line 17A and a tank line 8 are blocked by each other hydraulically by the directional change over valve 5, the pressurized hydraulic oil passing through the compensation valve 2 passes through a check valve 19 and then, returns to the directional change over valve 5 again. The pressurized hydraulic oil is then supplied through a line 17 to the hydraulic motor 6 for the revolution operation. The return hydraulic oil passes through a line 17D and flows via the directional change over valve 5 and through a tank line 17E to the tank 28. Accordingly, in this situation, the variable throttle 1 corresponds to the function of throttle in the open and close motion valve 136 in FIG. 1.

Embodiment 3

FIG. 3 and FIG. 4 illustrate inside the each valve body of the directional change over valve 5 and the compensation valve 2, which are formed in one body in the hydraulic circuit configuration shown in FIG. 2. In a neutral position of the directional change over valve 5 is found a spool 5a (see FIG. 3 and FIG. 4) of the directional change over valve 5, and a port 134 (see FIG. 3 and FIG. 4) that is connected with the tank 28 through the tank line 8. On the other hand, the spool 5a can be connected through the passage 17A with the downstream of the compensation valve 2.

FIG. 3 illustrates whole of the cross sectional view taken along the axis direction of the hydraulic control apparatus according to an embodiment of the present invention relating to sole revolution operations. FIG. 4 illustrates whole of the cross sectional view taken along the axis direction of the hydraulic control apparatus according to an embodiment of the present invention relating to complexity operation by combining the revolution with the operation of other actuators.

As illustrated in FIG. 3 and FIG. 4, respective valve bodies of the directional change over valve 5 and the compensation valve 2 are formed in one body provided with six common ports as shown in the figures, each port communicating with the valve 5 and the valve 2, and herein the six ports are defined as a first port, a second port, a third port, a fourth port, a fifth port and sixth port in series from the left to the right in the figures. In addition, FIG. 3 shows both of the spool 5a and spool 2a to be moved at the most right end. On the other hand, FIG. 4 shows the spool 5 a to be moved at the most right end and the spool 2a to be moved at the most left end.

Further, in FIGS. 3 and 4, when the spool 5a of the directional change over valve 5 is located at the neutral position of the directional change over valve 5, and the actuator is not operated, the pressurized hydraulic oil is not supplied from the variable capacity pump because the variable throttle 1 is closed.

On the other hand, as shown in the figures, when the spool 5a of the directional change over valve 5 is located at the most right position in the figures, and the actuator is operated, the spool 5a blocks the communication between the passage 17A and the tank line 8. Also, the pressurized hydraulic oil delivered from the variable capacity pump 7 is supplied via the delivery lines 12 and 12B, through the variable throttle 1 of the spool 5a in the directional change over valve 5 and a port 108 adjoining the variable throttle 1, and through a groove 110 formed in the side face of the spool 2a that slidably arranged in the center of the compensation valve 2 while being forced by the spring 3, the body of the valve 2 being formed in one body with that of the directional change over valve 5, and further through the check valve 19, and via passages 114, 116, 118, 120 and 122 to the hydraulic motor 6 for the revolution operation.

As shown in FIG. 4, when the spool 5a moves to the most right position with the full stroke, the inside hydraulic circuit is arranged in a way that the hydraulic oil flows through a small hole 113 passing through the inside passage 20 formed in the spool 2a of the compensation valve 2, and communicates with the tank line 8 through the tank passage 4.

The pressurized hydraulic oil from the hydraulic motor 6 for the revolution operation returns via the passages 124, 128, 130 and 132 to the tank 28. The hydraulic oil pressure at the upstream of the variable throttle 1 acts on the pressure room 11.

On the other hand, the hydraulic oil pressure (the load sensing pressure) at the downstream of the variable throttle 1 acts through the inside passage 20 formed in the spool 2a of the compensation valve 2 on the pressure room 9 and the load sensing line 11.

Next, the sole revolution operation will be explained. The delivery flow rate of the variable capacity pump 7 is determined by the load sensing hydraulic pressure (LS), the delivery flow rate control means 13, the control valve 14 for adjusting hydraulic oil pressure and the hydraulic pressure generating means 15. Further, the spring 3 opposes to the differential pressure at the upstream and at the downstream of the variable throttle 1. Accordingly, it is possible to bleed off, because the spool 2a of the compensation valve 2 is held on the right side in the figures, and is always connected through the tank passage 4 with the tank 28.

Next, the complex operation of combining the revolution operation with the operations of other actuators will be explained while referring to FIG. 4. FIG. 4 illustrates whole of the cross sectional view taken along the axis direction of the hydraulic control apparatus according to the present invention in case of the complexity operation by combining the revolution with the operation of other actuators. As stated, since the delivery flow rate of the variable capacity pump 7 is determined by the load sensing hydraulic pressure LS, the delivery flow rate control means 13, the control valve 14 for adjusting hydraulic oil pressure and the hydraulic pressure generating means 15, the excess flow rate of the pressurized hydraulic oil than that of the demand for the revolution operation will flow to the hydraulic motor 6 for the revolution operation when other hydraulic actuators have a heavy load than the load of the revolution operation. The differential pressure at the upstream and at the downstream of the variable throttle valve 1 can then become larger than the spring force of the spring 3, causing the spool 2a of the compensation valve 2 to move to the left in the figure, which is in the direction of closing. As the result, it is possible to prevent the delivery flow rate from increasing to excess.

The tank passage 4 is blocked as the spool 2a of the compensation valve 2 moves because the location of the tank passage 4 in the spool 2a of the compensation valve 2 is arranged with the dimensions so that the passage 4 is hidden in advance by the inner face of the iron wall forming the through hole 2b for the spool 2a of the compensation valve 2 when the spool 2a is moved to a control position. As the result, the tank passage 4 which allowed the pressurized hydraulic oil to pass as explained in FIG. 3 is blocked, and the bleeding off can be stopped, thereby preventing the reduction in operation efficiency in the complexity operation.

It should be understood, of course, that the foregoing disclosure relates only to preferred embodiments of the invention, and that it is intended to cover all changes and modifications of the example of the invention herein chosen for the purpose of the disclosure which does not constitute departures from the spirit and scope of the invention set forth in the appended claims.

Since the present invention relates to a hydraulic control apparatus such as a construction machine, for example, a hydraulic shovel and etc., provided with a plurality of hydraulic actuators, and more specifically relates to the hydraulic control apparatus enabling to selectively conduct a bleed off function such that when operating a relatively heavy load, a plurality of actuators are simultaneously operated, and when operating relatively light load, only one actuator is operated at the same time. In operating such relatively light load, failure due to occurrence of hunting is prevented by conducting the bleed off function, and when operating the heavy load, performance of a hydraulic control valve is elevated by suppressing the bleed off function, thereby improving the overall operation efficiency. The hydraulic control apparatus according to the present invention can be used for the power shovel, other hydraulic heavy equipments, and the hydraulic control apparatus for the machinery having a plurality of hydraulically driven actuators.

The invention claimed is:

1. A hydraulic control apparatus, comprising:
    a variable capacity pump;
    a first change over valve group including at least one change over valve connected with a first delivery line branched from a delivery line of the variable capacity pump and arranged to have a load sensing function;
    a delivery flow control means for adjusting a delivery flow rate of the variable capacity pump by receiving a hydraulic oil pressure signal from a load sensing line arranged in accordance with the change over valve having the load sensing function;
    a second change over valve group including at least one change over valve connected with a second delivery line branched from the delivery line of the variable capacity pump;
    an open and close motion valve connected with the second delivery line at a upstream side of the second change over valve group and having functions of open and close, and throttle in accordance with a hydraulic operation pressure signal applied to the change over valve belonging to the second change over valve group; and
    a compensation valve arranged at a downstream side of the open and close motion valve; an outlet side of the compensation valve being connected with the second change over valve group,
        wherein one side of the compensation valve is forced through force caused by hydraulic oil pressure at an outlet port of the open and close motion valve and a spring with a given spring force, and the opposite side of the compensation valve is forced through force caused by hydraulic oil pressure on the second delivery line,
        wherein the compensation valve is acted in the direction of opening by hydraulic oil pressure supplied from the outlet of the open and close motion valve due to the force on the one side, and is acted in the direction of closing by hydraulic oil pressure supplied from the inlet of the open and close motion valve due to the force on the opposite side, and
        wherein said compensation valve is provided with a bleed off passage which is connected with the outlet side of the open and close motion valve, and hydraulically communicates with a tank side when the force on said one side is greater than the force on said opposite side.

2. The hydraulic control apparatus according to claim 1, wherein said compensation valve is provided with a check valve arranged between the outlet side of said open and close motion valve, and said load sensing line.

3. The hydraulic control apparatus according to claim 1 or 2, wherein at least one change over valve of the second change over valve group is connected with a hydraulic motor for revolution operation of a hydraulic shovel.

4. The hydraulic control apparatus according to any one of claim 1, wherein at least one change over valve of the second change over valve group is a change over valve in which the open and close motion valve is incorporated.

5. The hydraulic control apparatus according to claim 4, wherein a valve body of at least one change over valve of the second change over valve group and a valve body of the compensation valve are constituted to be one body so that each hydraulic port of the change over valve and the compensation valve becomes common in the one body.

6. The hydraulic control apparatus according to any one of claim 1, wherein at least one change over valve of the second change over valve group is of the type of open center.

7. The hydraulic control apparatus according to any one of claim 1, wherein one change over valve of the first change over valve group is a change over valve for operating a boom provided in the hydraulic shovel, and one change over valve of the second change over valve group is a change over valve for operating a hydraulic motor for revolution operation provided in the hydraulic shovel.

* * * * *

UNITED STATES PATENT AND TRADEMARK OFFICE
CERTIFICATE OF CORRECTION

PATENT NO.       : 7,305,821 B2
APPLICATION NO.  : 11/315188
DATED            : December 11, 2007
INVENTOR(S)      : Masayuki Kobayashi and Kazumichi Aoki It is certified that error appears in the above-identified patent and that said Letters Patent is hereby corrected as shown below:

Column 1, Line 48, change "187" to --18Z--

Column 1, Line 50, change "527Z" to --52Z--

Column 1, Line 60, change "397" to --37Z--

Column 2, Line 55, change "37" to -- -3Z--

Column 2, Line 58, change "507" to --50Z--

Column 4, Line 18, change "347" to --34Z--

Column 4, Line 24, change "22z" to --22Z--

Column 4, Line 32, change "227" to --22Z--

Column 4, Line 32, change "227" to --22Z--

Column 5, Line 41, change "wider" to --under--

Column 9, Line 26, change "a" to --α--

Column 10, Line 29, change "111" to --11--

Column 12, Line 8, change "5 a" to --5a--

Column 12, Line 43, change "11" to --10--

Col. 14; Claim 4, Line 44, delete "any one of"

Col. 14; Claim 6, Line 54, delete "any one of"

Col. 14; Claim 7, Line 57, delete "any one of"

Signed and Sealed this

Tenth Day of February, 2009

JOHN DOLL
*Acting Director of the United States Patent and Trademark Office*